United States Patent [19]

Vyaznikov et al.

[11] Patent Number: 6,122,672

[45] Date of Patent: Sep. 19, 2000

[54] METHOD FOR SENDING MESSAGES AMONG A GROUP OF SUBSETS FORMING A NETWORK

[75] Inventors: Konstantin Vitalievich Vyaznikov, Moscow; Alexandr Mikhailovich Potryvaev, Schelkovo; Mikhail Jurievich Gnedovsky, Moscow; Dmitry Pavlovich Krasnonosenkikh, Protvino; Ilmir Rasikovich Alikberov, Moscow, all of Russian Federation

[73] Assignee: Samsung Electronics Co., Ltd., Suwon, Rep. of Korea

[21] Appl. No.: 09/101,950

[22] PCT Filed: Dec. 16, 1996

[86] PCT No.: PCT/RU96/00349

§ 371 Date: Jul. 21, 1998

§ 102(e) Date: Jul. 21, 1998

[87] PCT Pub. No.: WO98/27691

PCT Pub. Date: Jun. 25, 1998

[51] Int. Cl.[7] .................................................. G06F 13/00
[52] U.S. Cl. .......................... 709/238; 709/239; 709/242; 709/243
[58] Field of Search ..................................... 709/217, 218, 709/223, 224, 230, 238, 239, 240, 242, 243, 300; 370/351, 428

[56] References Cited

U.S. PATENT DOCUMENTS

| | | | |
|---|---|---|---|
| 4,800,488 | 1/1989 | Agrawal et al. | 364/200 |
| 4,870,571 | 9/1989 | Frink | 364/200 |
| 5,029,075 | 7/1991 | Hirasawa | 364/200 |
| 5,208,816 | 5/1993 | Seshardi et al. | 714/795 |
| 5,448,750 | 9/1995 | Eriksson et al. | 455/452 |
| 5,517,617 | 5/1996 | Sathaye et al. | 395/200.1 |
| 5,517,652 | 5/1996 | Miyamoto et al. | 395/800 |
| 5,903,545 | 5/1999 | Sabourin et al. | 370/225 |

FOREIGN PATENT DOCUMENTS

| | | |
|---|---|---|
| 1337902 | 9/1987 | U.S.S.R. . |
| 1497754 | 7/1989 | U.S.S.R. . |

OTHER PUBLICATIONS

Houttuin, J. "Classifications in E–mail Routing" Network Working Group, RFC 1711, RARE (Oct. 1994).
Partridge, C. "Mail Routing and the Domain System" Network Working Group, RFC 974, CSNET CIC BBN Laboratories Inc. (Jan. 1986).
Abstract of SU1337902 of Sep. 1987.
Abstract of SU 1497754 of Jul. 1989.

*Primary Examiner*—Viet D. Vu
*Attorney, Agent, or Firm*—Ladas & Parry

[57] ABSTRACT

The invention relates to a method for transmitting messages between networked subscriber units, which improves the network overall efficiency and allows the traffic load on the network units to be more uniformly distributed. At least one network service unit is assigned from the subscriber units to receive and intermediately store the messages. Each of the network elements generates a periodically transmitted service signal including identification and status information of the network element. On the basis of the received service signals, each of the network elements generates an accessibility ranked list 9 of all operative network elements, including a field 10 with identification of a subscriber unit, field 11 indicating the subscriber unit's function and field 12 indicating accessibility of the appropriate network element. The message is transmitted to the destination unit over a route determined on the basis of the ranked list of the network elements.

19 Claims, 2 Drawing Sheets

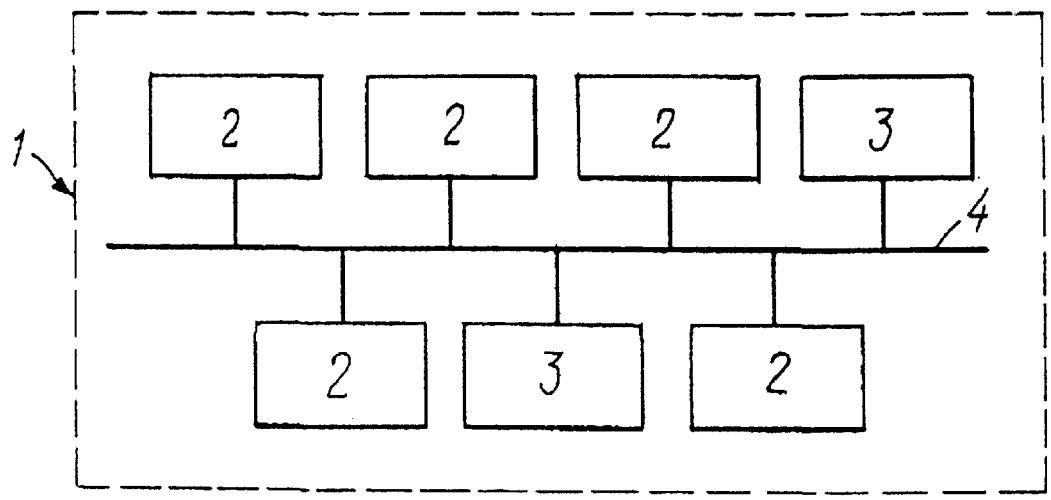
Fig.1
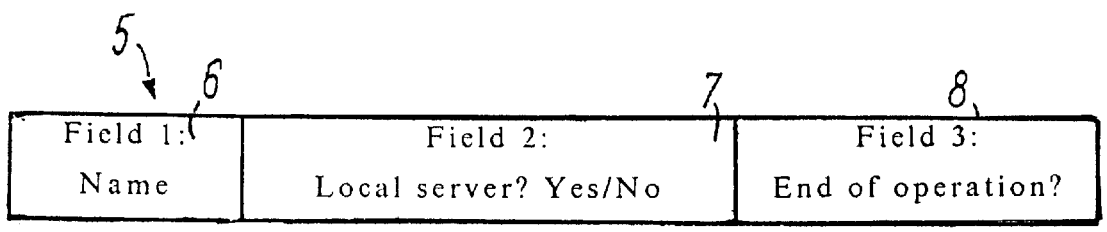
Fig.2
| Name | Local server? | Accessibility |
|---|---|---|
| Unit 4 | No | 98% |
| Unit 2 | Yes | 97% |
| Unit 5 | Yes | 93% |
| Unit 1 | Yes | 88% |
| Unit 6 | No | 83% |
| Unit 3 | this particular unit | |
| Unit 8 | No | 63% |
| Unit 7 | No | 33% |
Fig.3

METHOD FOR SENDING MESSAGES AMONG A GROUP OF SUBSETS FORMING A NETWORK

FIELD OF THE INVENTION

The present invention relates to methods for transmitting messages between an information sender and an information recipient and can be used for transmitting messages between networked subscriber units.

BACKGROUND OF THE INVENTION

Messages can be transmitted between subscriber units (computers), arranged in a single network, by various methods.

In a conventional, generally known "point-to-point" method for transmitting messages, messages are directly transmitted from one subscriber unit, a message sender, to another subscriber unit, a message recipient. This method provides the most economical way for transmitting messages. The method, however, suffers a significant problem: it is entirely impossible to transmit a message to a disabled destination subscriber unit, i.e. when the destination subscriber unit is turned off at the moment of transmitting a message to it and will be subsequently turned on after a lapse of time (off-line mode).

When a central server is used, a message sent by one network subscriber (a sender) to another subscriber (a called party) is first transmitted to a network central service unit (a server). The destination unit either periodically checks the central server for messages that are intended for it, or is informed of the presence of such messages by the central server itself, and receives the messages. This method allows the messages to be transmitted in the off-line mode.

The problem with the method for transmitting messages through a central server is the fact that a message transmission rate depends on the central server efficiency and a total number of simultaneously accessing subscribers. If the number of simultaneously operating subscribers is significant, heavy demands are imposed on the central server efficiency.

To improve the system reliability and to provide a possibility to occasionally disable the central server without disturbing the normal operation, the central server can be complemented with one or more backup servers. Messages transmitted via the central server are also simultaneously duplicated at the backup servers. When the central server is turned off, it will be replaced by a backup server, and, therefore, the system will not be disordered even if the central server is disabled.

A disadvantage of the redundant system is a necessity to duplicate operations of the central server at least at one backup server, i.e. to invoke additional resources. In this method, the message transmission rate is also defined by the relationship between the central server efficiency and a total number of simultaneously operating subscribers.

Known in the art is a method for transmitting messages, utilized in the Internet, that is based on a static routing principle. In this method of transmitting messages, each server having message reception and transmission functions, i.e. a "mail" server, comprises a list of other "mail" servers to which mail messages intended for destinations that are external to said server can be sent. If it is necessary to send a message to a destination unit that is assigned to another mail server, the next location to store the message will be selected from the static list of mail servers (see Mail Routing and the Domain System. C. Partridge. CSNET CIC BBN Laboratories Inc., January 1986. Network Working Group. Request for Comments: 974).

However, the method based on static routing fails to take into account such factors as a traffic load on servers. A route should be changed either through a direct instruction from the sender, or by a system administrator reconfiguring the mail server (see Classification in E-mail Routing. J. Houttuin, RARE October 1994, Network Working Group. Request for comments: 1711).

SUMMARY OF THE INVENTION

It is an object of the present invention to provide a method for transmitting messages between networked subscriber units, which overcomes the disadvantages of the aforementioned prior art methods. The method allows the efficiency of transmitting messages to be improved owing to the enhanced total efficiency of the network units through which the messages are sent, makes the traffic load more uniform, the messages can be transmitted even in the case when several servers are simultaneously disabled, and, ultimately, results in a lower cost.

The aforementioned technical result is attained by a method for transmitting messages between networked subscriber units, comprising generating, at a sender subscriber unit, a message including an address of a destination subscriber unit, and transmitting said message over network communication channels, wherein according to the present invention the method comprises the steps of assigning at least one network service unit from the subscriber units to receive and intermediately store the messages being transmitted; generating, at each of the network elements, both the assigned service units and the other subscriber units, a service signal comprising an identification and status information of a respective network element; transmitting the generated service signal at predetermined intervals over the network communication channels; receiving, at each of the network elements, the service signals transmitted by the other network elements, and processing the stream of incoming service signals to define accessibility of a respective network element; generating, at each of the network elements, on the basis of the received service signals, an accessibility ranked list of all operative network elements; and transmitting said message to the destination unit over a route determined on the basis of the generated ranked list of the network elements.

The accessibility of each network element is preferably defined in accordance with a traffic load on said element and communication channels connected with it, wherein the accessibility can be defined by a regularity of obtaining a service signal from said network element, preferably, by analyzing a distribution of time difference between arrivals of two successive transmissions of said periodic service signal.

The determination, at a sender subscriber unit, of a route for transmitting a message preferably includes determining the presence of a destination subscriber unit in the ranked list generated at said sender subscriber unit and its accessibility, and when said destination unit has an adequate accessibility, the message is transmitted directly to said destination unit.

When said destination unit is absent from said ranked list, the determination, at a sender subscriber unit, of a route for transmitting a message preferably includes further determining the most accessible network service unit in said list and transmitting the message to said network service unit; receiving the transmitted message at said network service unit; determining whether said destination subscriber unit is present in the ranked list generated at said network service unit and accessibility of said subscriber unit, and when said destination unit has an adequate accessibility, transmitting the received message to said destination unit; otherwise intermediately storing the message at said network service unit until said ranked list is updated and the destination subscriber unit appears therein.

However, when there is no accessible service unit in the ranked list generated at the sender subscriber unit, the message is intermediately stored at said sender unit until said ranked unit is updated and the destination subscriber unit appears therein.

If the assigned network service unit interrupts its operation, the non-send messages, that have been received at it, are preferably forwarded to another accessible assigned network service units.

Additionally, the successively generated messages are preferably transmitted from a particular sender subscriber unit to different assigned network service units selected from the ranked list of the network elements, that is generated at said sender subscriber unit.

The term "message" as used herein refers to a combination of user's information (content) and service information (address and other attributes) which is materially implemented as a record on material storage means (disk storage, memory locations) and transmitted by material transfer medium (electrical signals) in communication links, network apparatuses.

Transmission of a message refers to a physical transfer of a message from one subscriber unit to another subscriber unit of this sort, generally involving modification of a material representation of the message.

BRIEF DESCRIPTION OF DRAWINGS

For a more complete understanding of the present invention, reference is made to the following detailed description of its embodiment, taken in conjunction with the accompanying drawings in which:

FIG. 1 is a schematic representation of a network in which a method for transmitting messages can be implemented in accordance with the present invention;

FIG. 2 presents a logic structure of a message transmitted by a service signal, used to generate individual status maps as ranked lists of operative network elements;

FIG. 3 is an exemplary view of an individual status map generated on the basis of received service signals;

BEST MODE FOR CARRYING OUT THE INVENTION

Figure 4:
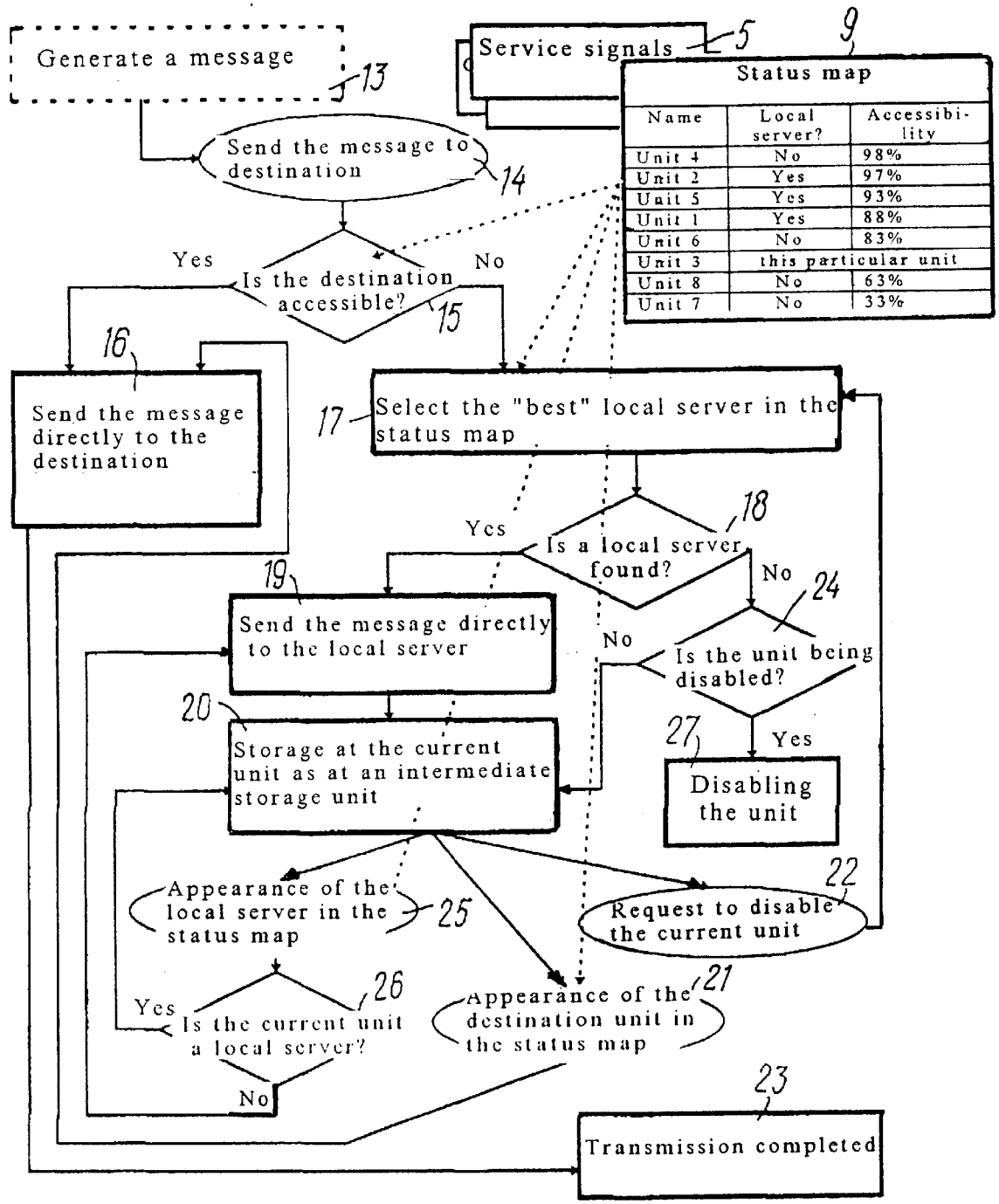
FIG. 4 is a flow diagram illustrating a method for transmitting messages between networked subscriber units in accordance with the present invention.

Referring to FIG. 1, a network 1 includes subscriber units 2, from which one or more network service units 3, i.e. servers, hereinafter referred to as local servers 3, can be assigned to receive and intermediately store the messages being transmitted.

The network elements 2, 3 are connected by a common bus 4.

The local servers 3 generally differ from the other subscriber units 2 by the fact that the local servers 3 are intended to perform an additional function—to receive and intermediately store "alien" messages, i.e. messages that are not outgoing of or intended for a particular subscriber unit assigned to perform a function of a local server. The "alien" messages are stored in a local server 3 at the same message directories where "native" messages are stored, i.e. messages relating to this local server as to a normal subscriber unit.

A procedure of assigning a subscriber unit 2 as a local server 3 essentially involves setting, prior to enabling, a flag identifying the subscriber unit as a local server. It will be appreciated that at successive enabling/disabling operations, the same subscriber unit can be assigned a local server, or become a normal network client acting as a usual subscriber unit 2 in the network. It will be also appreciated that such a temporary assignment of the local server functions to the subscriber units does not provide for selecting a central server from them, through which the messages should be transmitted to remote destination units in the network, as in the aforementioned prior methods with a centralized network configuration.

When being enabled, each of the network elements 2,3 sends, at predetermined intervals, a service signal representing a short message transmitted over an economic broadcast network channel with a non-guaranteed delivery. FIG. 2 illustrates a structure of a service signal 5 which includes identification and status information of an appropriate network element 2,3. More particularly, a field 6 of a message being transmitted as a service signal includes the network element name; field 7 indicates the network element status, i.e. whether it has a function of a local server; and field 8 identifies its operation state.

A service signal 5 is received by all of the network elements, i.e. both normal subscriber units 2 and local servers 3. Each of them dynamically, i.e. in a real time, generates, on the basis of the received service signals, an individual status map 9, an example of which is illustrated in FIG. 3. The individual status map 9 is a table comprising a ranked list of all network elements 2,3 transmitting service signals 5. Each individual status map includes three fields: a field 10 with a unique identification of a subscriber unit; a field 11 indicating the subscriber unit function (presence or absence of a local server function); a field 12 indicating accessibility of the respective subscriber unit, that is determined as will be described below. The list of subscriber units 2 and local servers 3 is arranged in a status map 9 in decreasing order of their accessibility which is determined by a regularity of receiving a service signal from them.

The regularity of receiving a service signal reflects, in integral form, a traffic load on the unit transmitting the signal and the network channels connecting the destination unit with the sender unit. The heavier is the traffic load on the destination unit and the channels connected with it, the less is the regularity of receiving service signals from it, and the lower will be a priority of accessing it as a network service unit in the individual status map. In a possible embodiment of the invention, a degree of regularity is calculated on the basis of distribution of time difference between arrivals of two successive transmissions of a periodic service signal from each of the subscriber units, which is considered as a random variable.

A status map 9 (FIG. 3) is generated in each operative network element (2,3) based on analysis of a stream of incoming service signals. When a service signal is received from a new (newly enabled) subscriber unit, the status map is supplemented with a record corresponding to this unit. When a service signal 5, including the end-of-operation indication for this unit in the operation state identification field 8 (FIG. 2), is received from a subscriber unit, a data record for the appropriate unit (destination unit) is deleted from the status map generated in a particular subscriber unit (sender). As mentioned above, the accessibility is calculated on the basis of analysis of distribution of time difference between arrivals of two successive service signal transmissions.

It should be noted that the same subscriber unit can have a different accessibility in the status maps of the other units by virtue of the performance peculiarities of network channels. A subscriber unit status map is unique for different subscriber units and varies with time as the traffic load on individual subscriber units and network channels changes, and also due to connecting/disconnecting subscriber units.

A particular embodiment of a method for transmitting messages in accordance with the invention will be described with reference to FIG. 4 which depicts a flow diagram of the method for transmitting messages.

At step 13, a sender subscriber unit generates a message to be transmitted to a destination unit, including the address of the message. At step 14, the generated message is forwarded to be transmitted to the intended destination unit. At step 15, a sender status map 9, generated on the basis of the received service signals 5, is checked to verify whether the destination unit is accessible. If affirmative, i.e. when the destination unit is present in the individual status map and has an adequate accessibility, the message is instantly and directly sent to the destination subscriber unit (step 16). If the result of checking at step 15 is negative, the best local server is further selected in the status map 9 at step 17. At step 18, the accessibility of the selected local server is checked. If affirmative, i.e. when the local server is present in the status map and has an adequate accessibility, the message is forwarded to the selected local server, at step 19, to intermediately store (step 20) the transmitted message until one of the following events occurs: the destination subscriber unit appears in the status map 9 at the local server (step 21), or a request is received to disable the local server (step 22). In the first case, i.e. when the destination subscriber unit is present or appears in the status map 9 at the selected local server, the message is immediately and directly sent to the destination subscriber unit (return to step 16) and the process of transmitting messages terminates by step 23.

In the second case, i.e. when at step 22 a request is received to disable the selected local server which has non-send messages, i.e. messages intended for a final destination that is currently inaccessible and for which the local server is an intermediate storage location, the process returns to step 17, i.e. a selection of another local server as the next intermediate storage location, for these messages.

If the result of checking at step 18 is negative, i.e. the status map 9 misses an accessible local server, a further check whether the sender unit is being disabled, is performed at step 24. If the result is negative, the message is stored at an intermediate storage location (return to step 20), which, in this case, is the sender unit itself, until one the following three events occurs: the destination unit appears in the status map 9 at the sender unit (step 21); an accessible local server appears in the status map 9 at the sender unit (step 25); the sender unit is disabled (step 22). In the first case, the message is sent directly to the destination unit (return to step 16). In the second case, when the local server appears in the status map 9 at the sender unit, a further check (step 26) is performed whether the non-sent message intermediate storage location is a local server. If the result of checking at step 26 is negative, i.e. when the message was stored in the sender unit, the message is forwarded to an accessible local server that has appeared in the status map 9 at the sender unit (return to step 19). The result of the step 26 check being affirmative, i.e. when the non-sent message was stored at the local server, the process returns to step 20 and the intermediate storage is continued at the local server. In this case if a request to disable the sender subscriber unit (step 22) appears prior to the aforementioned events, the non-sent messages will not be transmitted as the result of a sequence of operations at steps 17, 18, 24, 27.

Therefore, according to the present invention a procedure of selecting a local server as a the next location for intermediate storage of the message being transmitted, is performed dynamically, i.e. for every message, and responsive to traffic variation on the local servers, the successively transmitted messages can be forwarded to different local servers. This allows the traffic load on the local servers to be uniformly distributed.

Advantages of a method for transmitting messages according to the invention include:

1. Overall efficiency of the system is improved in direct proportion to a number of local servers. Owing to peculiarities of dynamic generation of individual status maps at the network subscriber units, the distribution of the traffic load among all local servers is statistically uniform.
2. No special demands are imposed on local servers, e.g. a high capacity is not required.
3. As opposed to the systems with a central server, a system, that functions in accordance with the claimed method, continues its operation even if several local servers have been simultaneously disabled, owing to traffic redistribution to the remaining local servers.
4. If a message destination unit is present in the network, a message can be transmitted as economically as in the point-to-point system, however, in contrast, the messages can be also transmitted when the destination unit is absent.

Industrial Applicability

The present invention can be utilized in systems for handling and transmitting messages between networked subscriber units.

We claim:

1. A method for transmitting messages between networked subscriber units, including generating, at a sender subscriber unit, a message with indication of an address of a message destination subscriber unit, and transmitting the entered message over the network communication channels, said method characterized by the steps of:

assigning at least one network service unit from the subscriber units to receive and intermediately store the messages being transmitted;

generating, at each of the network elements, both the assigned service units and the other subscriber units, a service signal comprising identification and status information of the respective network element;

transmitting the generated service signal at predetermined intervals over the network communication channels;

receiving, at each of the network elements, service signals transmitted by the other network elements and processing a stream of incoming service signals to define accessibility of respective network elements;

generating an accessibility ranked list of all operative network elements from the received service signals at each of the network elements;

transmitting the entered message over a route determined on the basis of the generated ranked list of the network elements.

2. A method as set forth in claim 1, wherein the accessibility of each of the network elements is determined in a accordance with the traffic load on said network element and communication channels connected with it.

3. A method as set forth in claim 2, wherein the traffic load is determined by a regularity of receiving a service signal from a respective network element by analysis of distribution of time difference between arrivals of a two successive transmissions of a periodic service signal from said element.

4. A method as set forth in any of claim 1, wherein the determining of a route for transmitting the entered message includes determining, at the sender subscriber unit, presence of a destination subscriber unit in a ranked list generated at said sender subscriber unit and accessibility of said destination subscriber unit, and when said destination subscriber unit has an adequate accessibility, the message is transmitted directly to said destination unit.

5. A method as set forth in claim 4, wherein, when the destination subscriber unit is absent from the ranked list generated at the sender subscriber unit, the determining of a route for transmitting the entered message further includes determining the most accessible network service unit in said ranked list, and transmitting the message to said network service unit;

receiving the transmitted message at the network service unit;

determining presence of said destination subscriber unit in the ranked list generated in said service unit and its accessibility, and, when said destination subscriber unit has an adequate accessibility, the message is transmitted to the destination subscriber unit;

otherwise intermediately storing the message at said service unit until said ranked list is updated and said destination subscriber unit is included into it.

6. A method as set forth in claim 5, wherein, when an accessible service unit is absent from the ranked list generated at the sender subscriber unit, the message is intermediately stored at said sender unit until said ranked list is updated and the destination subscriber unit is included into it.

7. A method as set forth in claim 5, wherein, when said assigned network service unit is disabled, the non-sent messages, received by it, are transferred to other accessible network service units.

8. A method as set forth in claim 1, wherein the messages successively generated at a particular destination subscriber unit are transmitted to different assigned network service units selected from the ranked list of the network elements, generated at said sender unit.

9. A method as set forth in claim 2, wherein the determining of a route for transmitting the entered message includes determining, at the sender subscriber unit, presence of a destination subscriber unit in a ranked list generated at said sender subscriber unit and accessibility of said destination subscriber unit, and when said destination subscriber unit has an adequate accessibility, the message is transmitted directly to said destination unit.

10. A method as set forth in claim 3, wherein the determining of a route for transmitting the entered message includes determining, at the sender subscriber unit, presence of a destination subscriber unit in a ranked list generated at said sender subscriber unit and accessibility of said destination subscriber unit, and when said destination subscriber unit has an adequate accessibility, the message is transmitted directly to said destination unit.

11. A method as set forth in claim 2, wherein the messages successively generated at a particular destination subscriber unit are transmitted to different assigned network service units selected from the ranked list of the network elements, generated at said sender unit.

12. A method as set forth in claim 3, wherein the messages successively generated at a particular destination subscriber unit are transmitted to different assigned network service units selected from the ranked list of the network elements, generated at said sender unit.

13. A method as set forth in claim 4, wherein the messages successively generated at a particular destination subscriber unit are transmitted to different assigned network service units selected from the ranked list of the network elements, generated at said sender unit.

14. A method as set forth in claim 5, wherein the messages successively generated at a particular destination subscriber unit are transmitted to different assigned network service units selected from the ranked list of the network elements, generated at said sender unit.

15. A method as set forth in claim 6, wherein the messages successively generated at a particular destination subscriber unit are transmitted to different assigned network service units selected from the ranked list of the network elements, generated at said sender unit.

16. A method as set forth in claim 7, wherein the messages successively generated at a particular destination subscriber unit are transmitted to different assigned network service units selected from the ranked list of the network elements, generated at said sender unit.

17. A method as set forth in claim 8, wherein the messages successively generated at a particular destination subscriber unit are transmitted to different assigned network service units selected from the ranked list of the network elements, generated at said sender unit.

18. A method as set forth in claim 9, wherein the messages successively generated at a particular destination subscriber unit are transmitted to different assigned network service units selected from the ranked list of the network elements, generated at said sender unit.

19. A method as set forth in claim 10, wherein the messages successively generated at a particular destination subscriber unit are transmitted to different assigned network service units selected from the ranked list of the network elements, generated at said sender unit.

* * * * *